(12) United States Patent
Sebire et al.

(10) Patent No.: US 7,058,132 B1
(45) Date of Patent: Jun. 6, 2006

(54) METHOD AND ARRANGEMENT FOR USING A SELECTED SIGNAL PROCESSING SCHEME TO CARRY INFORMATION

(75) Inventors: Guillaume Sebire, Helsinki (FI); Nikolai Nefedov, Espoo (FI)

(73) Assignee: Nokia Mobile Phones, Ltd., Espoo (FI)

( * ) Notice: Subject to any disclaimer, the term of this patent is extended or adjusted under 35 U.S.C. 154(b) by 1083 days.

(21) Appl. No.: 09/595,970

(22) Filed: Jun. 19, 2000

(30) Foreign Application Priority Data

Jun. 21, 1999 (FI) .................................... 991414

(51) Int. Cl.
*H04L 27/00* (2006.01)

(52) U.S. Cl. .................................... 375/259
(58) Field of Classification Search .............. 375/259, 375/286; 370/280–342, 345, 465, 521; 455/352, 455/418

See application file for complete search history.

(56) References Cited

U.S. PATENT DOCUMENTS

| | | | |
|---|---|---|---|
| 5,230,003 A | | 7/1993 | Dent et al. ..................... 371/43 |
| 5,438,590 A * | | 8/1995 | Tzukerman et al. ......... 375/259 |
| 5,548,834 A * | | 8/1996 | Suard et al. .............. 455/276.1 |
| 5,642,354 A * | | 6/1997 | Spear ......................... 370/329 |
| 5,696,792 A * | | 12/1997 | Sudo et al. ................. 375/279 |
| 5,751,725 A | | 5/1998 | Chen ........................... 371/5.5 |
| 5,909,434 A | | 6/1999 | Odenwalder et al. ....... 370/342 |
| 5,917,837 A | | 6/1999 | Stein ......................... 371/37.7 |
| 5,991,642 A * | | 11/1999 | Watanabe et al. ........... 455/560 |
| 6,014,374 A * | | 1/2000 | Paneth et al. ................ 370/345 |
| 6,052,408 A * | | 4/2000 | Trompower et al. ........ 375/141 |
| 6,122,310 A * | | 9/2000 | Ziemer et al. .............. 375/142 |
| 6,167,031 A * | | 12/2000 | Olofsson et al. ............ 370/252 |
| 6,256,487 B1 * | | 7/2001 | Bruhn ......................... 455/352 |
| 6,377,640 B1 * | | 4/2002 | Trans ......................... 375/354 |
| 6,377,797 B1 * | | 4/2002 | Schreib et al. .............. 455/418 |
| 6,393,064 B1 * | | 5/2002 | Nagai et al. ................ 375/259 |
| 6,567,475 B1 * | | 5/2003 | Dent et al. .................. 375/286 |
| 6,870,858 B1 * | | 3/2005 | Sebire ........................ 370/514 |
| 2004/0062269 A1 * | | 4/2004 | Western ...................... 370/465 |

FOREIGN PATENT DOCUMENTS

| | | | |
|---|---|---|---|
| EP | 1 052 821 A2 * | 11/2000 | |
| JP | 10247955 A * | 3/1997 | |
| JP | 409186635 A * | 7/1997 | |

OTHER PUBLICATIONS

"Smart codec: an adaptive packet data link", Fairhurst et al., Jun. 16, 1998, pp. 180-185.
"Issues in cooperative systems: extending the contract net protocol", Aknine S., Sep. 14, 1998, pp. 582-587.

* cited by examiner

*Primary Examiner*—Emmanuel Bayard
*Assistant Examiner*—Lawrence B. Williams
(74) *Attorney, Agent, or Firm*—Perman & Green, LLP (57) ABSTRACT

A method is presented for conveying information over a wireless interface in the form of a digitally encoded message. A set of bits is provided as a first piece of information to be transmitted, and a certain baseband signal processing method is applied to process the bits to be transmitted. In addition, a second piece of information is provided to be transmitted and the baseband signal processing method is selected from a set of allowed baseband signal processing methods in accordance with the provided second piece of information.

8 Claims, 8 Drawing Sheets

METHOD AND ARRANGEMENT FOR USING A SELECTED SIGNAL PROCESSING SCHEME TO CARRY INFORMATION

TECHNOLOGICAL FIELD

The invention concerns generally the technological field of conveying digital information over a wireless interface from a transmitting device to a receiving device. Especially the invention concerns the use of a certain selected signal processing scheme to carry meaningful information.

BACKGROUND OF THE INVENTION

In standardized digital wireless systems like digital cellular radio networks there is a standardized form for each message that a transmitting device is allowed to transmit over the wireless interface to the receiving device. Due to the limited number of available transmission frequencies and the requirements for minimized delays each message should be as compact as possible. This has resulted in difficulties when extensions and additions to the existing standards are made afterwards.

In digital wireless systems the contents of all messages are basically sequences of bits with a limited sequence length. The specifications usually reserve some otherwise unspecified bit combinations for future additions and extensions, but it may happen that in the future so many additions and extensions are made that these simply run out. In such a situation it is usually required that a completely new kind of a message is specified, which has serious implications in the form of required upgrading of system hardware and software.

As an example we will examine the known packet access burst format which is defined in the specifications of the GSM system (Global System for Mobile telecommunications) for the use of mobile stations when they want to request resources for a dedicated packet data channel. The definition of a packet access burst covers 157 consecutive bits according to Table I.

TABLE I

| Bit no. | Field length | Field contents | Definition |
|---|---|---|---|
| 0–7 | 8 | extended tail bits | 0, 0, 1, 1, 1, 0, 1, 0 |
| 8–48 | 41 | synchronization sequence | 0, 1, 0, 0, 1, 0, 1, 1, 0, 1, 1, 1, 1, 1, 1, 1, 1, 0, 0, 0, 1, 1, 0, 0, 1, 1, 0, 1, 0, 1, 0, 0, 0, 1, 1, 1, 0, 0, 0, 0, |
| 49–84 | 36 | encrypted bits | 11 information bits, 6 parity bits and a base station identifier; all coded together |
| 85–87 | 3 | tail bits | 0, 0, 0 |
| 88–156 | 68.25 | extended guard period | period of no transmission at all |

The actual information content of the packet access request must be represented by the 11 information bits mentioned on the middle row of Table I. It is clear that the amount of information that can be represented with only 11 bits is quite limited. Table II shows the definitions which are currently given to the contents of the field of 11 information bits.

TABLE II

| Bits | | | | | | | | | | | Packet Channel Access |
|---|---|---|---|---|---|---|---|---|---|---|---|
| 11 | 10 | 9 | 8 | 7 | 6 | 5 | 4 | 3 | 2 | 1 | |
| 0 | m | m | m | m | m | p | p | r | r | r | One Phase Access Request (OPAR) |
| 1 | 0 | 0 | n | n | n | p | p | r | r | r | Short Access Request (SAR) |
| 1 | 1 | 0 | 0 | 0 | 0 | p | p | r | r | r | Two Phase Access Request (TPAR) |
| 1 | 1 | 0 | 0 | 0 | 1 | p | p | r | r | r | Page Response |
| 1 | 1 | 0 | 0 | 1 | 0 | p | p | r | r | r | Cell Update |
| 1 | 1 | 0 | 0 | 1 | 1 | p | p | r | r | r | Mobility Management Procedure |
| 1 | 1 | 0 | 1 | 0 | 0 | r | r | r | r | r | Single Block w/o TBF establishment |
| All others | | | | | | | | | | | Reserved |

In the table a letter m represents a bit that is a part of a MS multislot class indicator (there are 29 classes, so 5 bits are required), a letter p represents a bit that is a part of a radio priority indicator (4 priorities, 2 bits), a letter n represents a bit that is a part of an indicator revealing the number of RLC (Radio Link Control) data blocks requested during a mobile-originated TBF (Temporary Block Flow) (max. 8 blocks, 3 bits) and a letter r represents a bit that is a part of a random reference in an otherwise unformatted field.

As a specific example, despite the relatively large number of "Reserved" bit combinations there appears to be no suitable and unspecified bit combinations that a mobile station could use to separately indicated its capability of using either the basic GPRS (General Packet Radio System), the EGPRS (Extended GPRS) with eight-level phase shift keying (8PSK) as the modulation method or the EGPRS without 8PSK as the modulation method, when the mobile station is making a One Phase Access Request (OPAR), a Short Access Request (SAR) or a Two Phase Access Request (TPAR). The possibility of even further similar needs is also foreseeable.

A proposal has been made to abandon the rule of having only one allowed form for the synchronization sequence (also known as the training sequence) and to use the selected form of the synchronization/training sequence as an indicator of a certain piece of information. However, this known solution has the drawback that it requires some complicated and potentially expensive changes to be made in some older devices existing in the networks that are to be used to provide the packet data services. Another proposal is to modulate the message to be transmitted with one of a set of alternative modulation methods so that the selection of the modulation method would indicate the modulation and demodulation capabilities of the device transmitting the message. This method is only applicable when there are several modulation methods to choose from, and it rules out the advantageous proposal of using always the simplest and robustest modulation method to modulate important messages like access requests.

SUMMARY OF THE INVENTION

It is an object of the present invention to provide a method for increasing the information transmission capacity of a message in a digital wireless system without the drawbacks of prior art solutions. It is also an object of the present invention to provide the hardware that is required to implement the method.

The objects of the invention are accomplished by defining a set of allowed signal processing methods that are used to prepare the contents of the message in the baseband domain before finally assembling it for transmission, and using a certain selection for the signal processing method to convey a certain piece of information.

The method according to the invention is characterized in that it comprises the steps of
   providing a second piece of information to be transmitted and
   selecting the baseband signal processing method from a set of allowed baseband signal processing methods in accordance with the provided second piece of information.

The invention also applies to a transmitting device which comprises the characteristic features of
   means for providing a second piece of information to be transmitted and
   means for selecting the baseband signal processing method from a set of allowed baseband signal processing methods in accordance with the provided second piece of information.

The invention applies further to a receiving device which comprises the characteristic features of
   means for selecting the baseband signal processing method from a set of allowed baseband signal processing methods so that applying it produces a first piece of received information which satisfies a certain criterion of acceptance and
   means for providing a second piece of received information in the form of the identified baseband signal processing method.

Additionally the invention applies to a digital wireless system which comprises the characteristic features of
   in the transmitting device means for providing a second piece of information to be transmitted and means for selecting the baseband signal processing method from a set of allowed baseband signal processing methods in accordance with the provided second piece of information, and
   in the receiving device means for selecting the baseband signal processing method from a set of allowed baseband signal processing methods so that applying it produces a first piece of received information which satisfies a certain criterion of acceptance and means for providing a second piece of received information in the form of the identified baseband signal processing method.

In the research work resulting in the invention it was noticed that several coding schemes that are used to compose the encoded contents of an information field in a message have features resembling orthogonality, i.e. it is only possible to decode a certain encoded bit sequence with the correctly selected decoding method while the decoding methods associated with the other coding schemes do not give any meaningful results. Consequently it was found out that the selection of coding scheme, or in wider sense the selection of a baseband signal processing method, can be used to convey a piece of information.

When a set of allowed baseband signal processing methods with their associated reverse processing methods have been defined, we may define an unequivocal correspondence between each individual baseband signal processing (and reverse processing) method and the corresponding piece of information which is most advantageously taken from a set of mutually exclusive pieces of information: if only one baseband signal processing method is selected at a time, only one piece of information may be conveyed by the selection. The transmitting device makes its selection according to which piece of information it wants to transmit. The receiving device does not generally know the selection beforehand, so typically it has to experiment with the different reverse processing methods to find the one which gives meaningul results.

As the baseband signal processing methods referred to above we may take for example different scrambling patterns, so that only the correct descrambling pattern restores the scrambled message in its original form, or different convolutional encoding schemes, so that the correct decoding scheme has to be found. It is advantageous to calculate a certain checksum from the information bits of the message before the selected baseband signal processing method is applied so that recalculating the checksum at the receiving end reveals the correct reverse processing method: the receiving device tries different reverse processing methods and the one that facilitates the calculation of a matching checksum is most probably the correct one. Only if a very specific error has occurred during transmission may it happen that actually an incorrect reverse processing method gives the message in a form where the checksum seems to match.

A further possible allowed set of mutually exclusive baseband signal processing methods may be formed around the process of calculating a checksum: the formula used to calculate the checksum is selected from a set of mutually (nearly) orthogonal formulas according to the piece of "additional" information which is to be transmitted, and the receiving device tries the calculation formulas one at a time until it finds the one which gives a matching checksum.

BRIEF DESCRIPTION OF DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

Similar parts in the drawing are referred to by the same reference designators.

DETAILED DESCRIPTION OF THE INVENTION

Figure 1A:
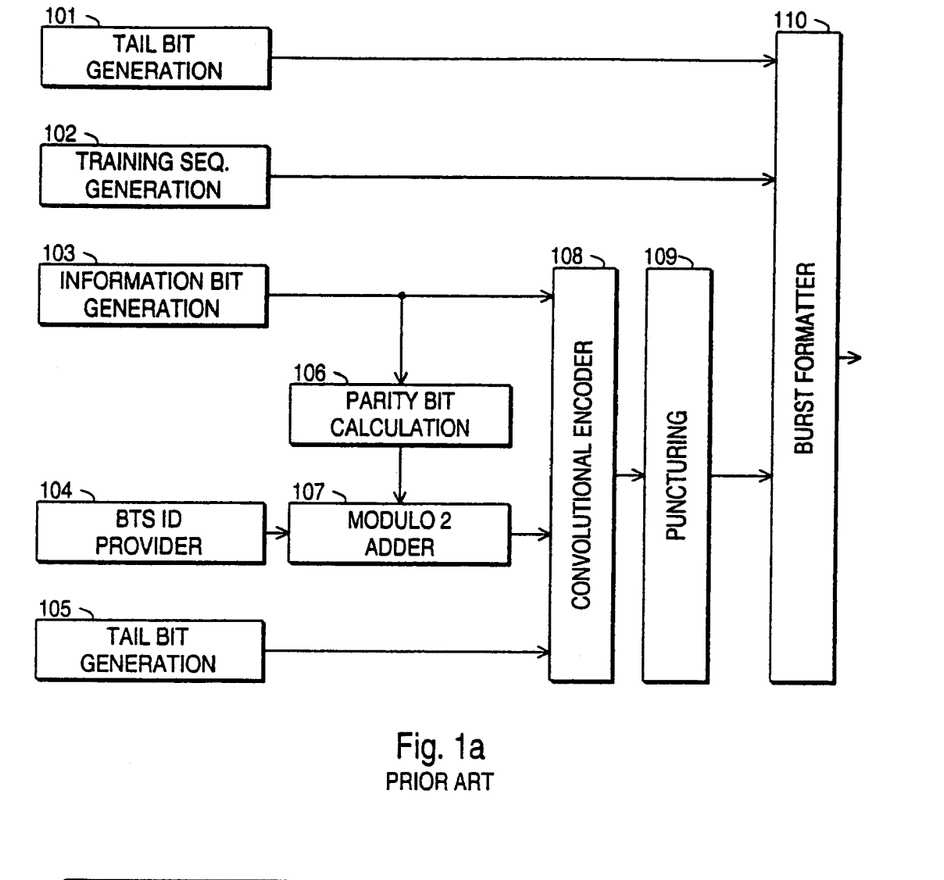
FIG. 1a illustrates a known encoding principle.

FIG. 1a is a schematic block diagram that illustrates the known encoding scheme that is used to compose a packet access request message in accordance with the known GSM and GPRS specifications. To start with there is at the left of FIG. 1a a first tail bit generator 101 to generate the constant bit patterns shown as extended tail bits and tail bits in Table I, a training sequence generator 102 to generate the synchronization sequence shown in Table I, an information bit generator 103 to generate the 11 information bits the use of which is shown in Table II, a BTS ID provider block 104 to provide the identifier of the base station to which the access request will be directed, and a second tail bit generator 105 to provide certain constant bits used in the encoding. The output of the information bit generator 103 is coupled to a parity bit calculator 106 which takes the eleven information bits $d(0), d(1), \ldots, d(10)$ and determines six parity bits $p(0), p(1), \ldots, p(5)$ so that the binary polynomial $d(0)D^{16} + \ldots + d(10)D^6 + p(0)D^5 + \ldots + p(5)$ when divided by $D^6 + D^5 + D^3 + D^2 + D + 1$ yields a remainder equal to $D^5 + D^4 + D^3 + D^2 + D + 1$, where the D's are certain multipliers defined in the system specifications. The parity bits $p(0), p(1), \ldots, p(5)$ are led to a modulo 2 adder block 107.

The BTS ID provider block 104 provides six identifier bits $B(0), B(1), \ldots, B(5)$ to the modulo 2 adder block 107 which then performs a bitwise modulo 2 addition resulting in six colour bits $C(0), C(1), \ldots, C(5)$ so that $C(k)=B(k)+p(k)$ for each k=0 to 5. The outputs of the information bit generator 103, the modulo 2 adder block 107 and the second tail bit generator 105 are coupled to the convolutional encoder 108 so that the twenty-one input bits $u(0), u(1), \ldots, u(20)$ thereof may be defined as follows: $u(k)=d(k)$ for k=0 to 10, $u(k)=C(k-11)$ for k=11 to 16 and $u(k)=0$ for k=17 to 20. From these twenty-one input bits $u(0), u(1), \ldots, u(20)$ the convolutional encoder 108 produces forty-two convolutionally encoded output bits $c(0), c(1), \ldots, c(41)$ by applying a convolutional code defined by the polynomials $G0=1+D^3+D^4$ and $G1=1+D+D^3+D^4$, i.e. $c(2k)=u(k)+u(k-3)+u(k)$ and $c(2k+1)=u(k)+u(k-1)+u(k-3)+u(k-4)$ for k=0 to 20 and $u(k)=0$ for k<0. These encoded bits are fed into the puncturing block 109 which removes the encoded bits $c(0), c(2), c(5), c(37), c(39)$ and $c(41)$ to produce the thirty-six encrypted bits mentioned in Table I. The outputs of the blocks 101, 102 and 109 are coupled to a burst formatter 110 which composes the actual transmission burst by putting the corresponding bits into the order shown in Table I.

Figure 1B:
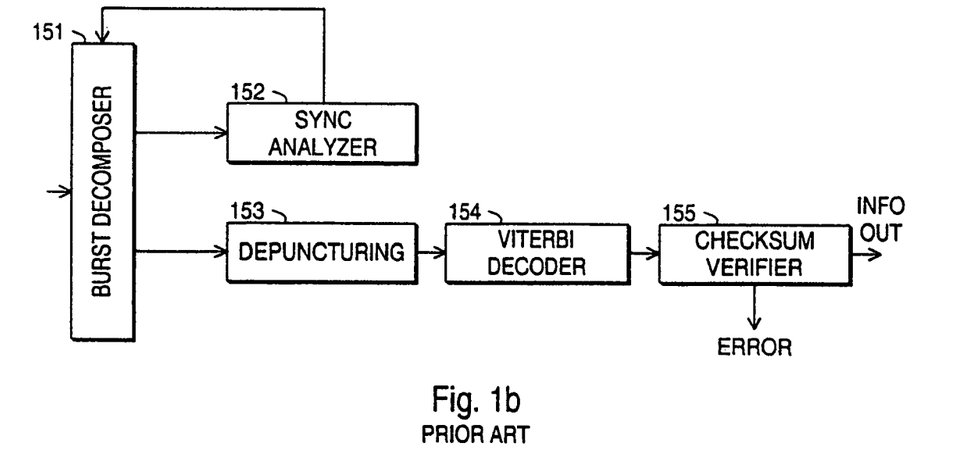
FIG. 1b illustrates a known decoding principle.

FIG. 1b is a schematic block diagram illustrating a known decoder used to decode transmissions where the packet access requests haven been composed by an encoding arrangement shown in FIG. 1a. A burst decomposer block 151 reverses the function of the burst formatter 110. The training sequence is used in the synchronization analyzer block 152 to provide timing feedback into the burst decomposition and previous receiving operations (not shown). A depuncturing block 153 is used to fill the punctured gaps in the sequence of coded bits by indefinite information, resulting in a restored sequence of forty-two encoded bits. A viterbi decoder 154 decodes the convolutional code and provides a sequence of twenty-one bits that should be the same as the bits $u(0), u(1), \ldots, u(20)$ referred to above, if no transmission errors have occurred. The reception takes place at a base station where the base station identifier is known, so from the C(k) bits that form a part of the u(k) bits the checksum verifier block 155 is able to deduce the original parity bits by a new bitwise addition. The checksum verifier block 155 recalculates the parity bits, also known as the checksum, from the original information bits and compares them to the parity bits received within the message. If there is a match the checksum verifier block 155 outputs the information bits, and if there is no match the checksum verifier block 155 gives an error indication causing the received packet access request to be neglected by the base station as erroneous.

Figure 2A:
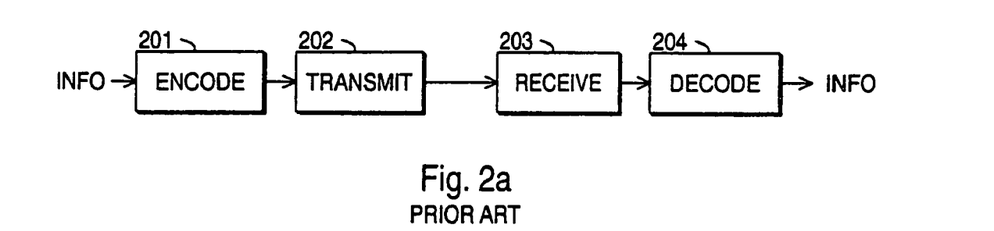
FIG. 2a summarizes the known functions of FIGS. 1a and 1b.

FIG. 2a summarizes the known functions of FIGS. 1a and 1b on a more abstract level. A certain piece of information is encoded in block 201 and transmitted by block 202 in encoded form. In the receiving end the encoded piece of information is received by block 203 and decoded by block 204. In the absence of transmission errors the same piece of information is thus restored.

Figure 2B:
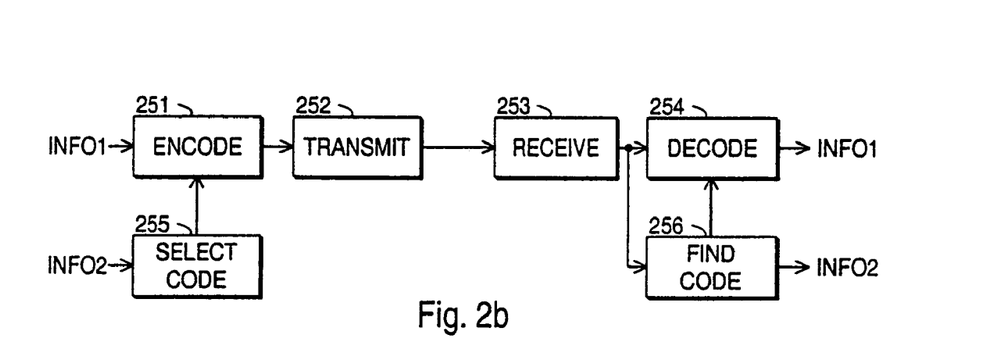
FIG. 2b illustrates an advantageous coding and decoding principle according to the invention.

FIG. 2b shows how a second piece of information may be conveyed by selecting the coding scheme in a certain way. The first piece of information is actually conveyed through the encoder 251, the transmitter 252, the receiver 253 and the decoder 254 substantially similarly as in FIG. 2a. However, there are more encoding schemes available than just one, and the second piece of information defines the selection through block 255. Similarly in the receiving end there is a block 256 the task of which is to find out which coding scheme has been applied and to instruct the decoder block 254 to use the correct decoding method. The identification of the correct coding scheme simultaneously reveals the second piece of information.

The combination of two different pieces of information may naturally be used for conveying arbitrary messages, but the invention is particularly useful in situations where the first piece of information stays the same and the second piece of information is some additional information that should also be conveyed to the receiving device. A typical example is the signalling of the capabilities of the mobile station to the base station in association with a packet access request. The basic information stays the same: the mobile station wants to send a One Phase Access Request (OPAR), a Short Access Request (SAR) or a Two Phase Access Request (TPAR). However, simultaneously it wants to inform the base station about its eventual EGPRS capability with or without the 8PSK modulation method.

We may define the alternative coding schemes (or more generally the baseband signal processing schemes) that are used to signal the mobile station's capabilities so that the known coding scheme explained above in association with FIGS. 1a and 1b is one of them, and especially the known coding scheme is the one that indicates that the mobile station only has the basic capabilities known from prior art. This definition has the advantage that even all devices that have not been made to operate according to the present invention will continue to function properly despite of the introduction of the invention.

Figure 3A:
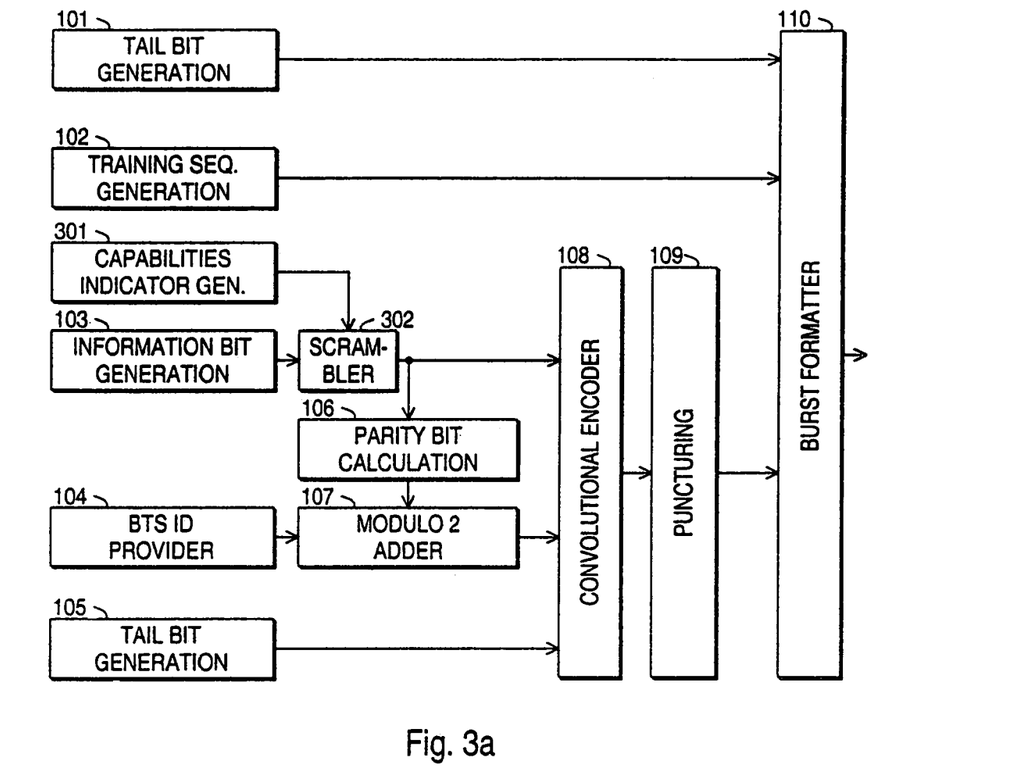
FIG. 3a illustrates an encoding principle according to a first embodiment of the invention.

FIG. 3a is a more detailed block diagram of an encoder according to a certain first embodiment of the invention. The blocks of the encoder which are known from FIG. 1a are complemented by a capabilities indicator generator block 301 which determines the capability indication which should be transmitted to a base station as a part of a packet access request. Taken that there are three alternative capabilities (basic GPRS, EGPRS with 8PSK, EGPRS without 8PSK) to be signalled to the base station, the output of block 301 need not be anything else than a two-bit indicator the defined values of which correspond to the mentioned alternative capabilities. Additionally there is a scrambler block 302 located at the output of the information bit generator 103. The scrambler 302 is programmed to respond to the allowed two-bit indicator values it receives from block 301 by selecting and implementing a distinctive scrambling function that unequivocally corresponds to the current indicator value. A scrambling function means that the bits are rearranged to another order. One of the scrambling functions is most advantageously a "null scrambling" function meaning that no scrambling at all is made; this is most advantageously the one that corresponds to the signalling of "basic GPRS".

The capabilities indicator generator block 301 may give always the same indicator value that describes the full capability of the mobile station, or it may be programmable so that for example a user selection may cause the mobile station to act as if it did not have all the capabilities it actually has. For example if the pricing policy applied by the network operator favours basic GPRS mobile stations it may be advantageous to make a mobile station act like one.

The alternative scrambling functions implemented by the scrambling block should be "orthogonal" in the sense that if a set of parity bits is calculated for a set of information bits scrambled by a certain first scrambling function it is not possible that the same parity bits are obtained for a certain other set of information bits scrambled by another scrambling function. Suitable scrambling functions may be found through experimenting.

Figure 3B:
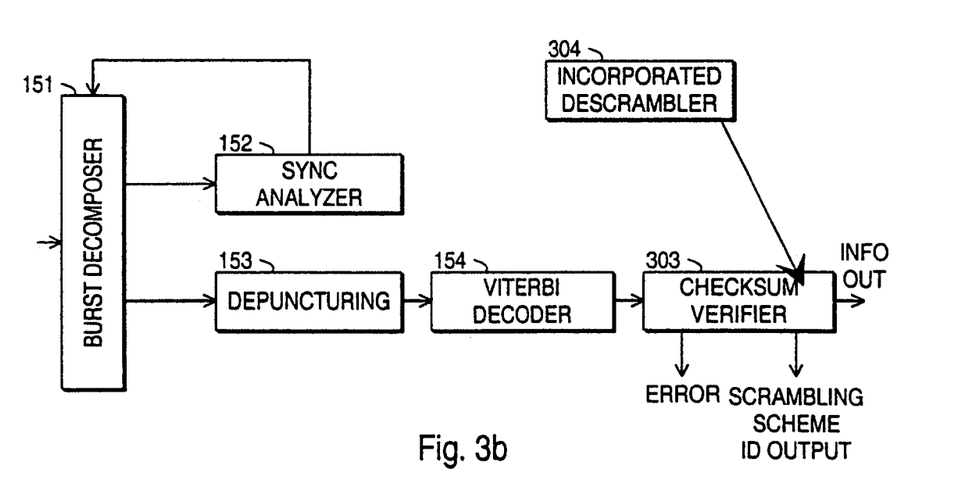
FIG. 3b illustrates a decoding principle according to the first embodiment of the invention.

FIG. 3b is a schematic block diagram illustrating a decoder which should be used to decode transmissions where the packet access requests haven been composed by an encoding arrangement shown in FIG. 3a. The most important difference to the known arrangement is that the checksum verifier block 303 houses an incorporated descrambler 304. The task of the descrambler 304 is to reverse the effect of the scrambling function used in the transmitting end. Advantageously the combined checksum verifier and descrambler block 303/304 operates so that from each received and viterbi decoded packet access request the eleven scrambled information bits are restored and the steps of descrambling them and calculating the parity bits for the result is repeated for all three possible descrambling functions. If exactly one of the descrambling functions gives an information bit sequence for which the parity bit calculation gives a match, the checksum verifier and descrambler block 303/304 gives at one output the identifier of the identified descrambling method, which is then the same as the descriptor for the mobile station's capabilities. This information is led to a functional block at the base station and/or at a base station controller that stores the capability information describing the mobile stations (not shown). If none of the descrambling methods results in a parity match, or if two or more descrambling methods result in a parity match the error indication output (and/or the identified descrambling method output) is used to indicate an error, whereby the packet access request should be denied.

It is possible to have the decoder to try the different descrambling functions only until it finds a match, but this makes it impossible to detect an error which causes at least two descrambling functions to erroneously give positive results.

Figure 4A:
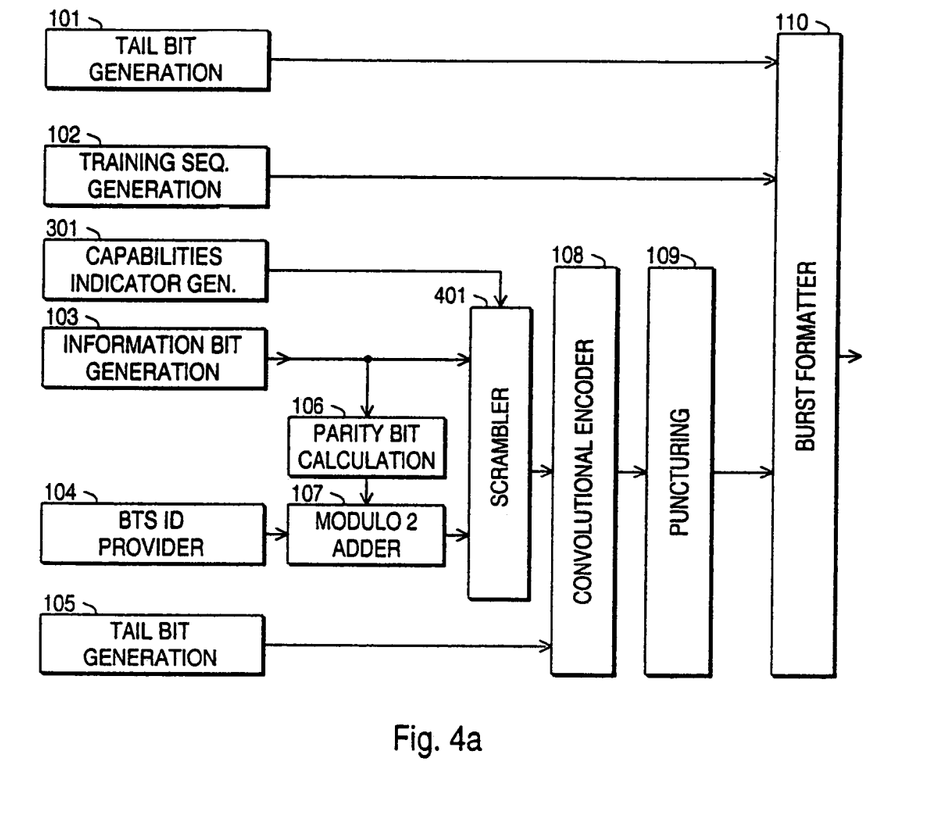
FIG. 4a illustrates an encoding principle according to a second embodiment of the invention.
Figure 4B:
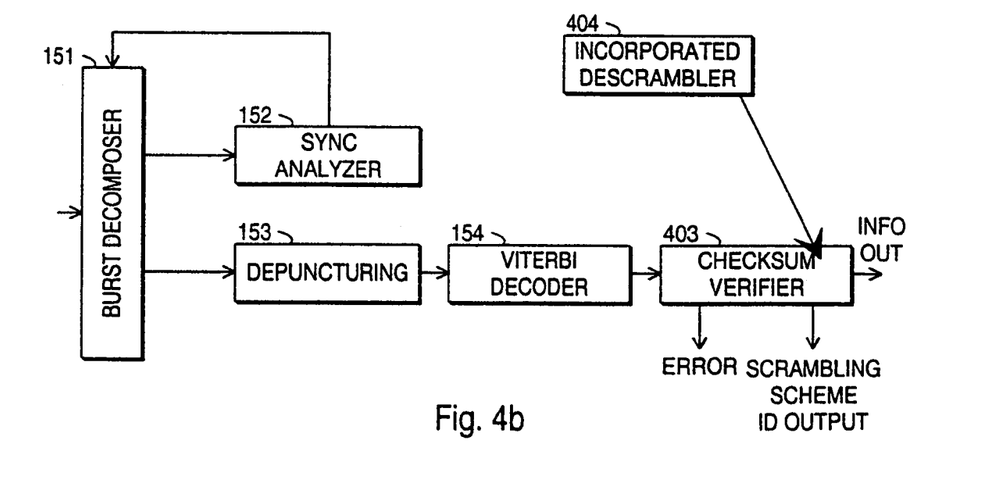
FIG. 4b illustrates a decoding principle according to the second embodiment of the invention.

FIG. 4a shows an alternative embodiment where the capabilities indicator generator block 301 operates as described above but its output is led to scrambler 401 which scrambles the parity encoded bits u(k), k=0 to 16 instead of the information bits d(k), k=0 to 10 as in FIG. 3a. In other words the scrambler 401 is coupled to the outputs of the information bit generator 103 and the modulo 2 adder block 107. Otherwise the same considerations as above apply to its operation. Similarly in FIG. 4b the checksum verifier 403 now houses an incorporated descrambler 404 that is arranged to perform the descrambling function before the decomposition of the combined BTS ID, parity and information bits into these parts. Otherwise the same condirations apply also to the receiver part that were given above in association with FIG. 3b.

Figure 5A:
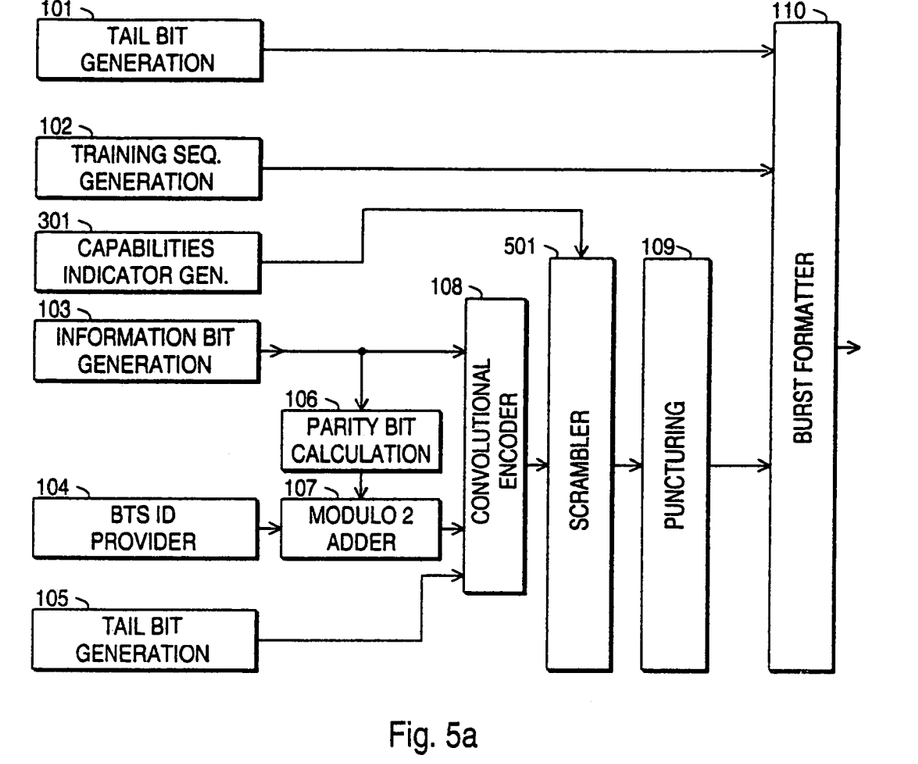
FIG. 5a illustrates an encoding principle according to a third embodiment of the invention.
Figure 5B:
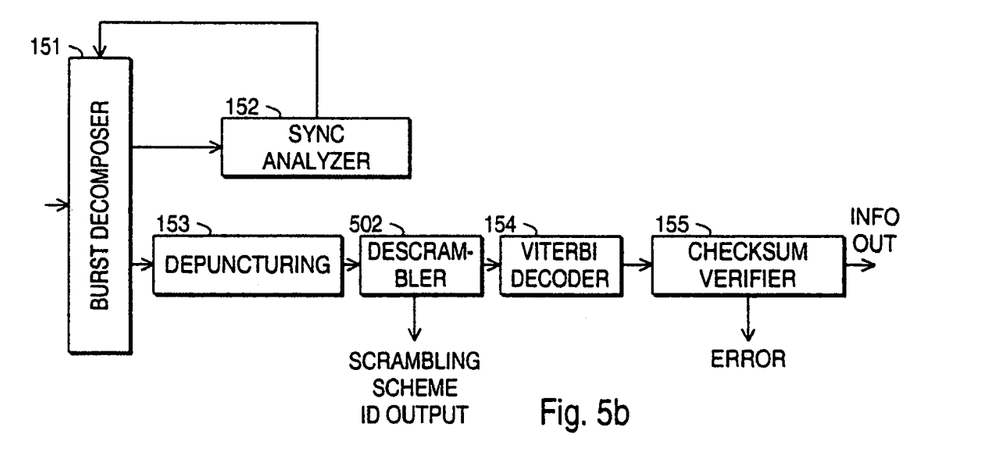
FIG. 5b illustrates a decoding principle according to the third embodiment of the invention.

FIG. 5a shows yet an alternative embodiment where the capabilities indicator generator block 301 again operates as described above but its output is led to scrambler 501 which scrambles the output of the convolutional encoder 108, i.e. the coded bits c(k), k=0 to 41, instead of the parity encoded bits u(k), k=0 to 16 as in FIG. 4a or the information bits d(k), k=0 to 10 as in FIG. 3a. Otherwise the same considerations as above apply to its operation. FIG. 5b shows the decoding arrangement where the checksum verifier 155 may now be similar to those in prior art decoders, because the descrambling function is implemented in a separate descrambling block 502 between the output of the depuncturing block 153 and the input of the viterbi decoder 154. Because the descrambling function is now separated from the checksum verifier, the operation of the whole decoder chain must be coordinated so that after depuncturing a separate decoding run from the descrambling step to the checksum verification step is made for each alternative descrambling function. Otherwise the operation is as explained above: one correctly decoding descrambling function is taken as an indication of successfully identified capabilities indicator from the mobile station, and fewer or more correctly decoding descrambling functions are interpreted as errors. The identification of the correct descrambling method is got by comparing the indicator outputs of blocks 502 and 155.

Figure 6A:
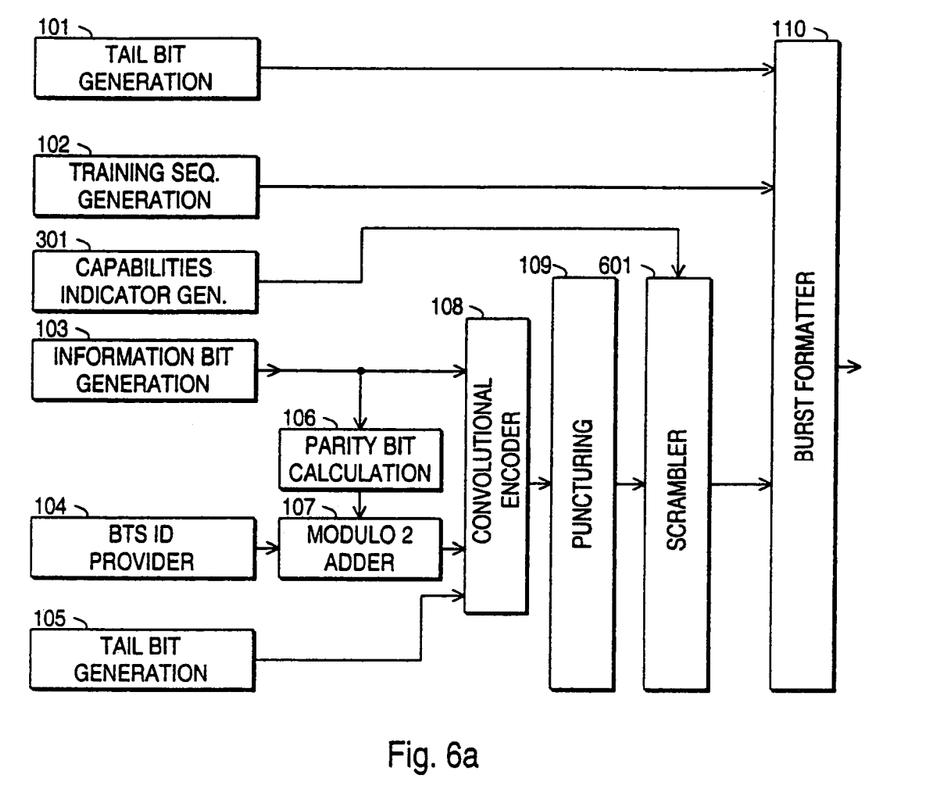
FIG. 6a illustrates an encoding principle according to a fourth embodiment of the invention.
Figure 6B:
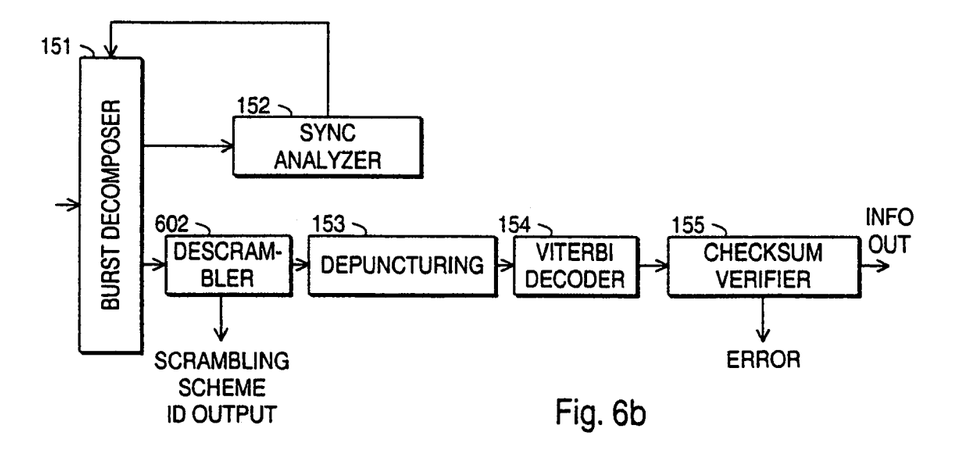
FIG. 6b illustrates a decoding principle according to the fourth embodiment of the invention.

FIG. 6a shows yet an alternative embodiment where the capabilities indicator generator block 301 again operates as described above but its output is led to scrambler 601 which scrambles the output of the puncturing block 109, i.e. the coded and punctured bits c(k), k=1 to 40 but not 2, 5, 37 or 39, instead of the coded bits c(k), k=0 to 41 as in FIG. 5a, the parity encoded bits u(k), k=0 to 16 as in FIG. 4a or the information bits d(k), k=0 to 10 as in FIG. 3a. Otherwise the same considerations as above apply to its operation. FIG. 6b shows the decoding arrangement where the checksum verifier 155 may again be similar to those in prior art decoders, because the descrambling function is implemented in a separate descrambling block 602 between the output of the burst decomposer block 151 and the input of the depuncturing block 153. The descrambling function is again separated from the checksum verifier, so the operation of the whole decoder chain must be coordinated so that a completely separate decoding run from the descrambling step through depuncturing, viterbi decoding and checksum verification is made for each alternative descrambling function. Otherwise the operation is as explained above: one correctly decoding descrambling function is taken as an indication of successfully identified capabilities indicator from the mobile station, and fewer or more correctly decoding descrambling functions are interpreted as errors. The identification of the correct descrambling method is got by comparing the indicator outputs of blocks 602 and 155.

The embodiments given above may be varied for example so that to indicate basic GPRS capabilities no scrambling is made at all, to indicate EGPRS capabilities with 8PSK a certain first scrambling function is applied at a certain first location in the encoding chain, and to indicate EGPRS capabilities without 8PSK a certain second scrambling function is applied at a certain second location in the encoding chain. Allowing several kinds of alternative scrambling functions to take place at several alternative locations in the encoding chain also increases the number of individual and distinctive pieces of information that can be conveyed by using solely the application of scrambling as an identifier, but simultaneously it makes the required decoder structure more complicated and the required decoder processing speed faster since a large number of decoding runs must be made to make sure that exactly one descrambling method gives the correct result.

Figure 7A:
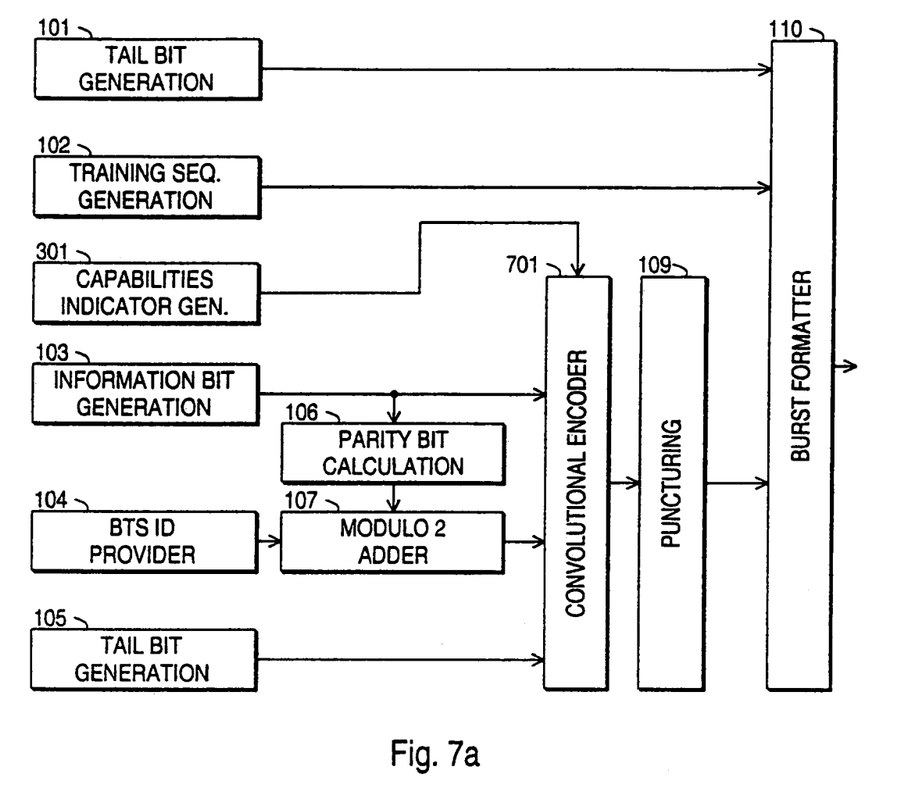
FIG. 7a illustrates an encoding principle according to a fifth embodiment of the invention.
Figure 7B:
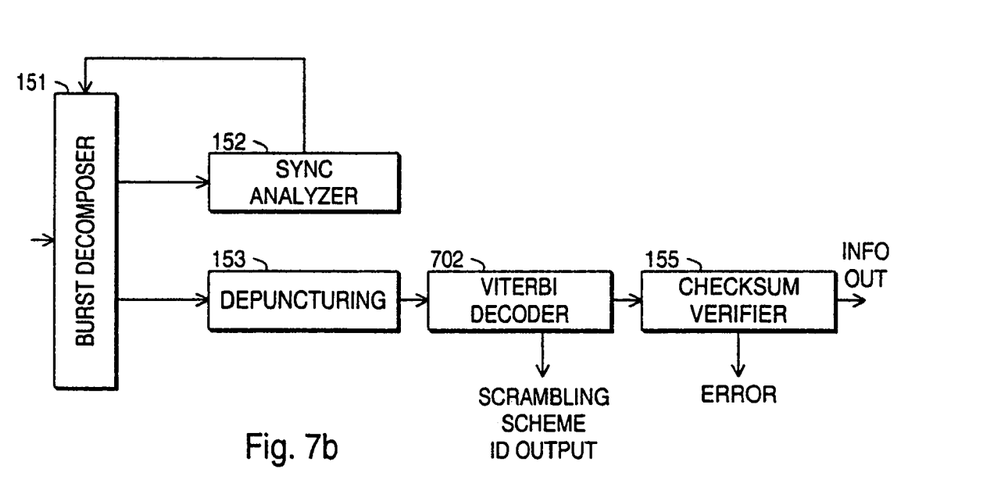
FIG. 7b illustrates a decoding principle according to the fifth embodiment of the invention.

FIG. 7a shows yet another embodiment of the invention in the form of a schematic block diagram of an encoder. Other parts of the encoder are as in FIG. 3a, but there is no scrambler at all. Instead there is a convolutional encoder 701 which is capable of alternatively applying one of at least three different and substantially orthogonal convolutional codes depending on the input it receives from the capabilities indicator generator block 301. One of the convolutional codes is the one known from prior art and given above, and other suitably orthogonal convolutional codes are easily obtained by applying the known theory of convolutional codes and/or by experimenting. In the decoder of FIG. 7b the viterbi decoder 702 is similarly capable of alternatively applying one of at least three decoding schemes which correspond one-to-one to the substantially orthogonal convolutional codes used at the transmitter. The indication of successful decoding (exactly one decoding scheme is allowed to be successful) goes as is explained above in association with descrambling.

Figure 8A:
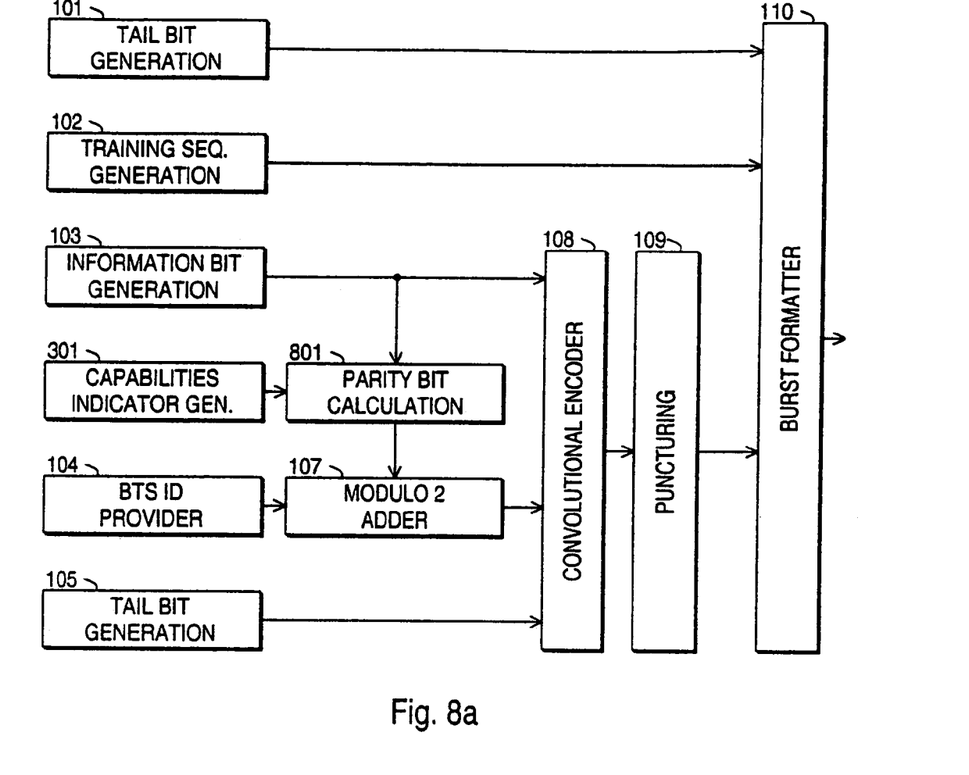
Figure 8B:
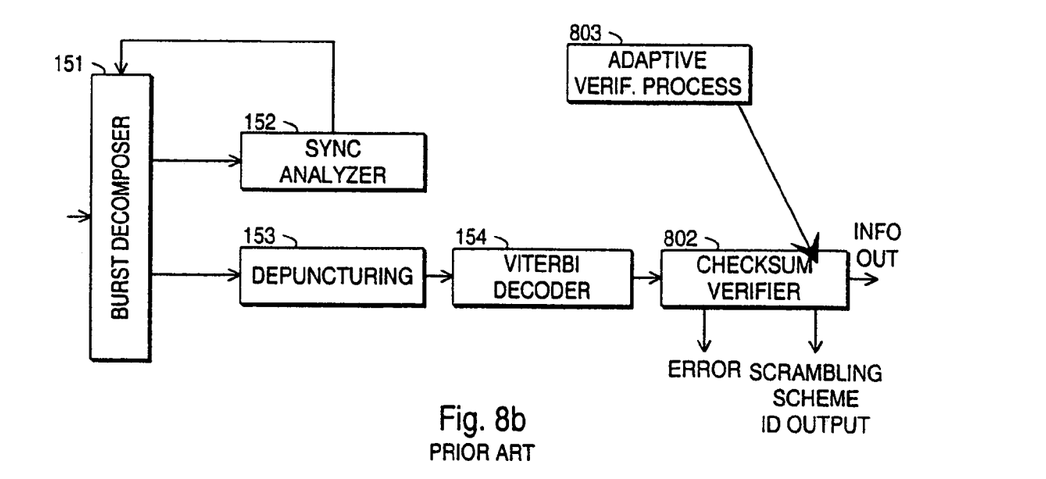

In addition to the scrambling/descrambling and convolutional coding/viterbi decoding alternatives described above it is possible to use different definitions for the blocks that calculate the parity bits in the transmitting end and verify them in the receiving end. FIGS. 8a and 8b show block diagrams of such embodiments of the invention; affected blocks are the blocks 801, 802 and 803.

The invention claimed is:

1. A method for conveying information over a wireless interface in the form of a digitally encoded message, said message comprising:
providing a set of bits as a first piece of information to be transmitted,
applying a certain baseband signal processing method to process the bits to be transmitted,
providing a second piece of information to be transmitted, said second piece of information indicating capabilities of a transmitter for said first and second pieces of information, and
selecting the baseband signal processing method from a set of allowed baseband signal processing methods in accordance with the provided second piece of information.

2. A transmitting device for transmitting information over a wireless interface in the form of a digitally encoded message, said device comprising:
means for providing a set of bits as a first piece of information to be transmitted,
means for applying a certain baseband signal processing method to process the bits to be transmitted,
means for providing a second piece of information to be transmitted, said second piece of information indicating capabilities of a transmitter for said first and second pieces of information, and means for selecting the baseband signal processing method from a set of allowed baseband signal processing methods in accordance with the provided second piece of information.

3. A receiving device for receiving information over a wireless interface in the form of a digitally encoded message, said device comprising:
means for receiving a set of bits as the representative of a first piece of received information,
means for applying a certain baseband signal processing method to process the set of bits,
means for selecting the baseband signal processing method from a set of allowed baseband signal processing methods so that applying the selected baseband signal processing method produces a first piece of received information which satisfies a certain criterion of acceptance, and
means for providing a second piece of received information in the form of the selected baseband signal processing method, said second piece of information indicating capabilities of a transmitter for said first and second pieces of information.

4. A communication system comprising:
a transmitting device and a receiving device,
the transmitting device including means for providing a set of bits as a first piece of information to be transmitted and means for applying a certain baseband signal processing method to process the bits to be transmitted,
the transmitting device further including means for providing a second piece of information to be transmitted, said second piece of information indicating capabilities of a transmitter for said first and second pieces of information, and means for selecting the baseband signal processing method from a set of allowed baseband signal processing methods in accordance with the provided second piece of information,
the receiving device including means for receiving a set of bits as the representative of a first piece of received information and means for applying a certain baseband signal processing method to process the set of bits, and
the receiving device further including means for selecting the baseband signal processing method from a set of allowed baseband signal processing methods so that applying the selected baseband signal processing method produces a first piece of received information which satisfies a certain criterion of acceptance and means for providing a second piece of received information in the form of the selected baseband signal processing method.

5. The method of claim 1, wherein said selection comprises selecting the baseband signal processing method from between alternative scrambling functions, between alternative convolutional codes or between alternative parity bit calculation methods in accordance with the provided second piece of information.

6. The transmitting device of claim 2, wherein said selecting means includes means for selecting the baseband signal processing method from between alternative scrambling functions, between alternative convolutional codes or between alternative parity bit calculation methods in accordance with the provided second piece of information.

7. The receiving device of claim 3, wherein said selecting means includes means for selecting the baseband signal processing method from between alternative scrambling functions, between alternative convolutional codes or between alternative parity bit calculation methods in accordance with the provided second piece of information.

8. The communication system of claim 4, wherein said selecting means includes means for selecting the baseband signal processing method from between alternative scrambling functions, between alternative convolutional codes or between alternative parity bit calculation methods in accordance with the provided second piece of information.

* * * * *